United States Patent [19]
Berndt

[11] Patent Number: 4,491,426
[45] Date of Patent: Jan. 1, 1985

[54] TEMPERATURE SENSING ASSEMBLY

[75] Inventor: Dieter Berndt, Neptune, N.J.

[73] Assignee: TRP Energy Sensors, Inc., New York, N.Y.

[21] Appl. No.: 429,068

[22] Filed: Sep. 30, 1982

[51] Int. Cl.$^3$ .............................. G01K 5/00
[52] U.S. Cl. ............................ 374/194; 374/190
[58] Field of Search ............. 128/736; 374/194, 151, 374/158, 190

[56] References Cited

U.S. PATENT DOCUMENTS

| | | | |
|---|---|---|---|
| 2,445,539 | 7/1948 | Singer | 128/736 |
| 2,797,682 | 7/1957 | Kannenberg | 128/736 |
| 3,117,450 | 1/1964 | Hoy | 374/151 |
| 3,780,586 | 12/1973 | Donofrio | 128/736 |
| 3,913,402 | 10/1975 | Doyle | 128/736 |
| 4,072,054 | 2/1978 | Blovin et al. | 128/736 |
| 4,083,364 | 4/1978 | Kelly et al. | 128/736 |

*Primary Examiner*—Charles Frankfort
*Assistant Examiner*—David R. Schuster
*Attorney, Agent, or Firm*—Louis E. Marn

[57] ABSTRACT

A temperature sensing assembly comprised of clinical thermometer including a reservoir portion disposed in a body member comprised of a shaft portion having a lip positioning element at one end and an outwardly extending flared bulbous portion at the other end for positioning within the oral cavity wherein the clinical thermometer is disposed in a channel formed in the body member whereby by reservoir portions of the clinical thermometer coextends with the bulbous portion of the body member into the oral cavity of the mammal being temperature sensed.

7 Claims, 6 Drawing Figures

TEMPERATURE SENSING ASSEMBLY

FIELD OF THE INVENTION

This invention relates to an assembly for sensing temperature, and more particularly to an assembly for sensing a temperature within the oral cavity of a mammal, e.g. a homo sapien.

BACKGROUND OF THE INVENTION

Oral and rectal thermometers having a temperature range of from about 92 to 106° F. have been in use for many years for sensing the temperature, inter alia, of the human body. The use of oral thermometers with infants is particularly troublesome due to the difficulty of keeping such thermometer in the baby's mouth under conditions and for a time sufficient to permit the inserted portion of the thermometer to reach ambient conditions therein and thereby produce a reasonably accurate reading of the actual temperature of the subject being temperature sensed. As infants age with concomitant cutting of teeth, the use of an oral thermometer becomes hazardous due to the possibility of breakage as well as greater awareness by the subject to a foreign object.

Many assemblies including a thermometer have been proposed for sensing the temperature of the oral cavity of a human, e.g. U.S. Pat. Nos. 358,141; 2,008,754; 2,445,539; 2,797,682; 2,844,031; 3,780,586; 3,913,402 and 4,072,054. Of such assemblies, U.S. Pat. No. 2,445,539 to Singer discloses an assembly including a clinical thermometer in a body member and positioned below the tongue in the oral cavity of a human. The body member, howver, does not ensure physiological acceptance below the tongue nor facile continued placement below the tongue since the same is maintained in position by lip pressure. Additionally, the assembly of the Singer reference does not permit effective salivary flow nor comfort in swallowing saliva.

U.S. Pat. No. 2,797,682 to Kannenberg discloses an assembly for more positive positioning of the clinical thermometer below the tongue of the user provided proper initial placement. The assembly does not ensure continued placement, however, since the body is held in place by the front teeth of the user, particularly considering the normal desired to move the lower jawbone with respect to the upper jawbone during usage. Additionally, such assembly suffers from the hereinabove noted defects, i.e. ineffective salivary flow and discomfort in swallowing.

OBJECTS OF THE INVENTION

It is an object of the present invention to provide a novel assembly for sensing the temperature within the oral cavity of a mammal, and in particular a homo sapien.

Another object of the present invention is to provide a novel assembly for sensing the temperature of a mammal permitting of facile physiologically-acceptable placement of the thermometer thereof below the tongue in the oral cavity of the mammal.

Still another object of the present invention is to provide a novel assembly for sensing the temperature of a mammal in the oral cavity thereof permitting of effective and normal salivary flow during sensing.

A further object of the present invention is to provide a novel assembly for sensing the temperature of a mammal in the oral cavity obviating discomfort in swallowing during sensing.

A still further object of the present invention is to provide a novel assembly for sensing the temperature of a mammal permitting of effective placement below the tongue in the oral cavity of the mammal being sensed.

Yet another object of the present invention is to provide a novel assembly for sensing the temperature permitting essentially continued proper placement below the tongue in the oral cavity of the mammal during sensing.

SUMMARY OF THE INVENTION

These and other objects of the present invention are achieved by a temperature sensing assembly comprised of clinical theremometer including a reservoir portion disposed in a body member comprised of a shaft portion having a limiting lip positioning element at one end and an outwardly extending flared bulbous portion at the other end wherein the clinical thermometer is disposed in a channel formed in the body member whereby the reservoir portions of the clinical thermometer coextends with the bulbous portion of the body member for positioning the thermometer into the oral cavity of the mammal being temperature sensed.

BRIEF DESCRIPTION OF THE DRAWINGS

A better understanding of the present invention as well as other objects and advantages thereof will become apparent upon consideration of the detailed disclosure thereof, especially when taken with the accompanying drawing, wherein.

DETAILED DESCRIPTION OF THE INVENTION

Figure 1:
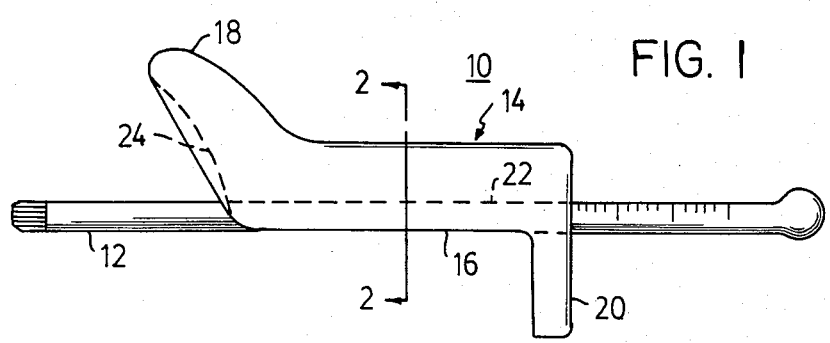
FIG. 1 is an elevational view, of the temperature sensing assembly of the present invention.
Figure 2:
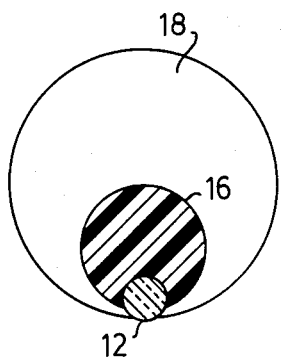
FIG. 2 is an sectional view of the body member of the temperature sensing assembly taken along the line 2—2 of FIG. 1.

Referring now to FIGS. 1 and 2, there is illustrated a temperature sensing assembly, generally indicated as 10, comprised of a clinical thermometer 12 disposed in a body member, generally indicated as 14. The body member 14 of the temperature sensing assembly 10 of the present invention is formed of a non-toxic elastomeric material, such as a foodgrade plasticized polyvinyl chloride or synthetic rubber, or the like.

Figure 3:
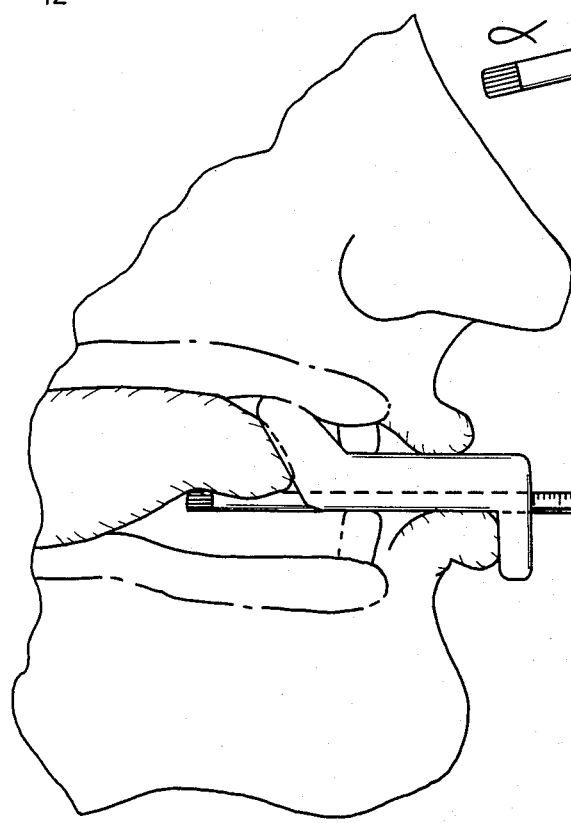
FIG. 3 is a view of the temperature sensing assembly of the present invention in the oral cavity of a human shown fancifully in section.

The body member 14 is formed of a cylindrically-shaped shaft portion 16 of circular cross-section, a generally upwardly and forwardly extending bulbous portion 18 and a limiting lip positioning portion 20; the bulbous portion 18 and the limiting lip portion 20 being formed on respective ends of the shaft portion 16, referring to FIGS. 1 to 3. The body member 14 is formed with an elongated groove or channel 22 in a plane coaxially-disposed with respect to the axis of the cylindrically-shaped shaft portion 16, although the axis of such a groove or channel 22 may be in a plane other than coplane with respect to the axis of the shaft portion 16.

The bulbous portion 18 is preferably formed with a concave leading surface 24 in a plane generally perpendicular to the axis of the shaft portion 16 to enhance physiological acceptance and placement in the oral cavity of the user. The limiting lip positioning portion is hemicircular-shaped and is provided to minimize possible ingestion of the temperature sensing assembly 10.

The groove or channel 22 in the body member is preferably sized to the diameter of the thermometer 12 to retain the thermometer 12 in rigid but slidable relationship with respect to the body member 14. In this regard, the groove or channel 22 may be formed about circumferential portion of the body member 14 to permit positioning therein by longitudinal placement and insertion of the thermometer 12, or may be internally formed thereby requiring insertion of the thermometer 12 through the channel 22 in the body member 14.

Figure 4:
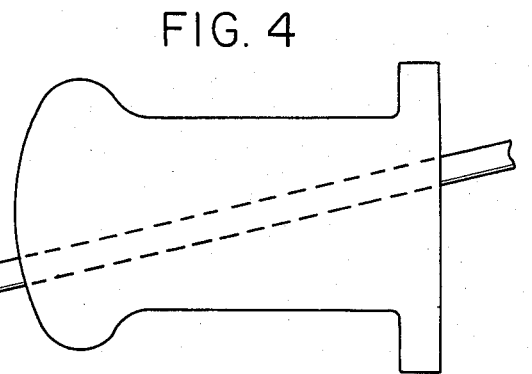
FIG. 4 is a top view, partially in section of another embodiment of the present invention.
Figure 5:
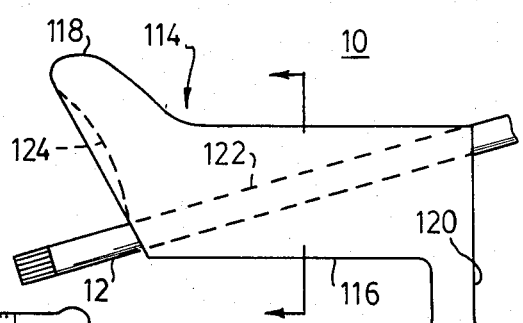
FIG. 5 is a side view of the embodiment of FIG. 4.
Figure 6:
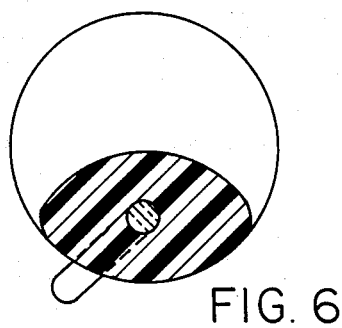
FIG. 6 is a sectional view of the embodiment of FIG. 5 taken along the line 6–6 of FIG. 5.

FIGS. 4 to 6 illustrates another embodiment of the temperature sensing assembly of the present invention, generally indicated as 110, and comprised of a clinical thermometer 12 disposed in a body member, generally indicated as 114. The body member 114 is comprised of a cylindrically-shaped shaft portion 16 of elliptical cross-section, a generally upwardly and forwardly extending bulbous portion 118 and a limiting lip positioning portion 120; the bulbous portion 118 and the limiting lip portion 120 being formed on respective ends of the shaft portion 116, referring to FIGS. 4 to 6. The body member 114 is formed with a downwardly and outwardly formed channel 122 from the limiting lip portion 120 towards the bottom portion 118 at an angle acute to the main axis of the body member 114, referring particularly to FIG. 4. Angle being between about 1° to 20°.

This embodiment of the present invention insures more comfortable as well as more positive positioning of the thermometer 12 between the tongue and the aveolar bone of the lower mandible of the user.

From the foregoing, it must be evident that the present invention is an advance of the art in that it permits positive positioning of a thermometer in the mouth of a user permitting effective salvary flow and comfortable swallowing. Since placement of the thermometer is always constant, errors that may arise from faulty insertion and placement are thereby eliminated.

Numerous modifications and variations of the invention are possible in light of the above teachings and therefore this invention may be practiced otherwise than as particularly described.

What is claimed:

1. Temperature sensing assembly for insertion in the oral cavity of a mammal, which comprises:
   a body member comprised of a shaft portion and a bulbous portion and having a channel formed therein, said shaft portion being cylindrically-shaped and circular in cross-section, said bulbous portion formed with a concave leading surface for engaging a tongue in said oral cavity, and extending upwardly and forwardly of said shaft portion, and
   a thermometer disposed in said channel extending outwardly from a lower position of said bulbous portion thereby positioning said thermometer below said tongue in said oral cavity whereby said bulbous portion is caused to press said tongue against said thermometer.

2. The temperature sensing assembly as defined in claim 1 wherein said shaft portion is cylindrically-shaped and elliptical in cross-section.

3. The temperature sensing assembly as defined in claim 1 and including a limiting lip positioning portion formed on said body member opposite said bulbous portion.

4. The temperature sensing assembly as defined in claim 1 wherein an axis of said channel is formed in a plane coaxial with an axis of said shaft portion.

5. The temperature sensing assembly as defined in claim 1 wherein an axis of said channel is at an acute with respect to an axis of said shaft portion.

6. The temperature sensing assembly as defined in claim 1 wherein said channel extends outwardly and downwardly in said shaft portion toward said bulbous portion.

7. The temperature sensing assembly as defined in claim 1 wherein said channel is a groove formed about a circumferential surface portion of said body member thereby permitting said thermometer to be readily snapped into said groove.

* * * * *